UNITED STATES PATENT OFFICE.

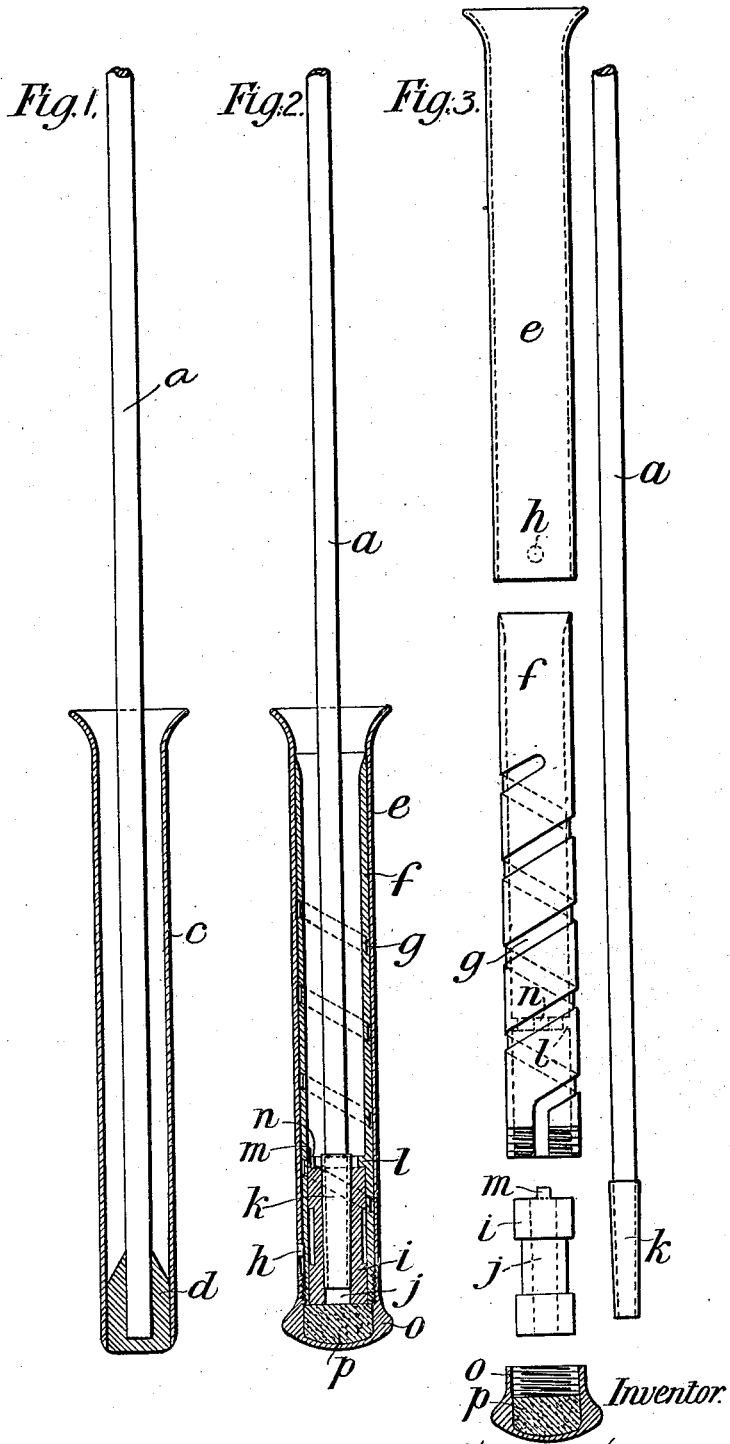

FORSTER HARDY, OF SOUTH EALING, ENGLAND.

FISHING-ROD.

1,351,473. Specification of Letters Patent. Patented Aug. 31, 1920.

Application filed July 1, 1919. Serial No. 307,984.

*To all whom it may concern:*

Be it known that I, FORSTER HARDY, a subject of the King of Great Britain, residing at 14 Hereford road, South Ealing, Middlesex, England, have invented new and useful Improvements in Fishing-Rods, of which the following is a specification.

My invention relates to fishing rods, and it has for its object to provide a rod which will be more resilient in action than such rods as hitherto made.

A fishing rod as now made use of, and when in use, is grasped at a point adjacent to the butt end, so that the point of the said grip or support is that about which the rod can bend, the flexibility therefore being limited by the length of the rod comprised between the tip and the point of support or grip.

Now, the object of my invention is to provide a construction of rod in which the effective length is increased and thereby the degree of resiliency or flexibility of the rod, and to this end I form a rod with a forward extension on the butt end, this extension constituting a handle or grip by means of which the rod can be grasped, the effective length of the said rod being, as will be obvious, increased, by an extent corresponding to the length of the said extension.

In a rod embodying the invention the extension is in the form of a tube which may be telescopic, and to the bottom of which the butt end of the fishing rod is secured.

To enable the invention to be fully understood, I will describe it by reference to the accompanying drawing, in which:—

Figure 1 is a side view partly in section of a portion of a fishing rod embodying the invention.

Fig. 2 is a view similar to Fig. 1 illustrating a modified construction of a rod according to the invention, and Fig. 3 is a sectional side view illustrating the parts of the rod shown in Fig. 2 separate from one another.

Referring first to the form of the invention shown in Fig. 1 $a$ indicates the rod and $c$ the forward extension which is provided at its butt end, this extension being advantageously of a larger diameter than that of the rod so as to facilitate its manipulation.

As will be understood, although the rod is grasped at approximately the same position relatively to the butt end as is usually the case, yet the effective length of the rod is increased by an amount approximately equal to the length of the forward extension $c$, thus increasing the resiliency or flexibility of the rod.

In the construction illustrated in Fig. 1 the extension $c$, is of tubular form or, in other words, the extension is of annular form completely inclosing the end of the rod $a$ which is secured to a block $d$ provided in the bottom of the tubular handle $c$. As will be noticed, the open end of the said tubular handle is flared or of a bell mouth shape to permit of greater freedom of movement of the rod.

In Figs. 2 and 3 I have shown a modification of the invention. In this construction the tubular handle is made telescopic and comprises an outer tube or cylinder $e$ which slides upon the inner tube or cylinder $f$, the latter being furnished with a spiral slot $g$ in its external surface with which a pin or feather $h$ on the inside of the tube $e$ engages, this construction being advantageously provided to facilitate the extension and contraction of the handle. The butt end of the inner tube $f$ of the handle is provided with the loose interchangeable block $i$ having a taper hole $j$ in which the taper butt end $k$ of the rod $a$ is designed to be forced, the said block $i$ being retained in position within the tube $f$ by means of an internal shoulder $l$ in the said tube. A tooth $m$ upon the forward end of the block $i$ engages a notch $n$ in the shoulder $l$ and prevents the block from rotating within the tube. By making the block $i$ removable, rods of different diameters can be secured within the tube $f$.

$o$ is a cap which is screwed upon the extremity of the tube $f$ so as to provide a stop for the outer tube $e$, the said cap being preferably furnished with a rubber block $p$ against which the block $i$ abuts to take up vibration.

Claims:

1. A fishing rod having a handle secured to its butt end only and extending forwardly of said butt end, and an adjustable extension provided on said handle for increasing the effective length thereof.

2. A fishing rod having a tubular handle surrounding the rod secured to its butt end only and extending forwardly of said butt end, and an adjustable extension provided on said tubular handle for increasing the effective length thereof.

3. A fishing rod having a tubular handle surrounding the rod, secured to its butt end only and extending forwardly of said butt end, and a tubular extension for said handle having a threaded connection therewith.

4. A fishing rod provided at its butt end with a detachable block, a tubular handle surrounding said block and extending forwardly thereof, means for locking the handle and block together to prevent relative rotation, a knob secured to said handle and locking the block in place, and a tubular extension provided on the handle and adjustably connected thereto.

5. A fishing rod having a detachable block at its butt end, a tubular handle surrounding the rod and connected to the block only, and a tubular extension having a threaded connection with said handle.

6. A fishing rod having a tubular handle surrounding the rod, secured to its butt end only and extending forwardly of said butt end, the forward end of said handle being flared outwardly away from the rod.

FORSTER HARDY.